United States Patent Office.

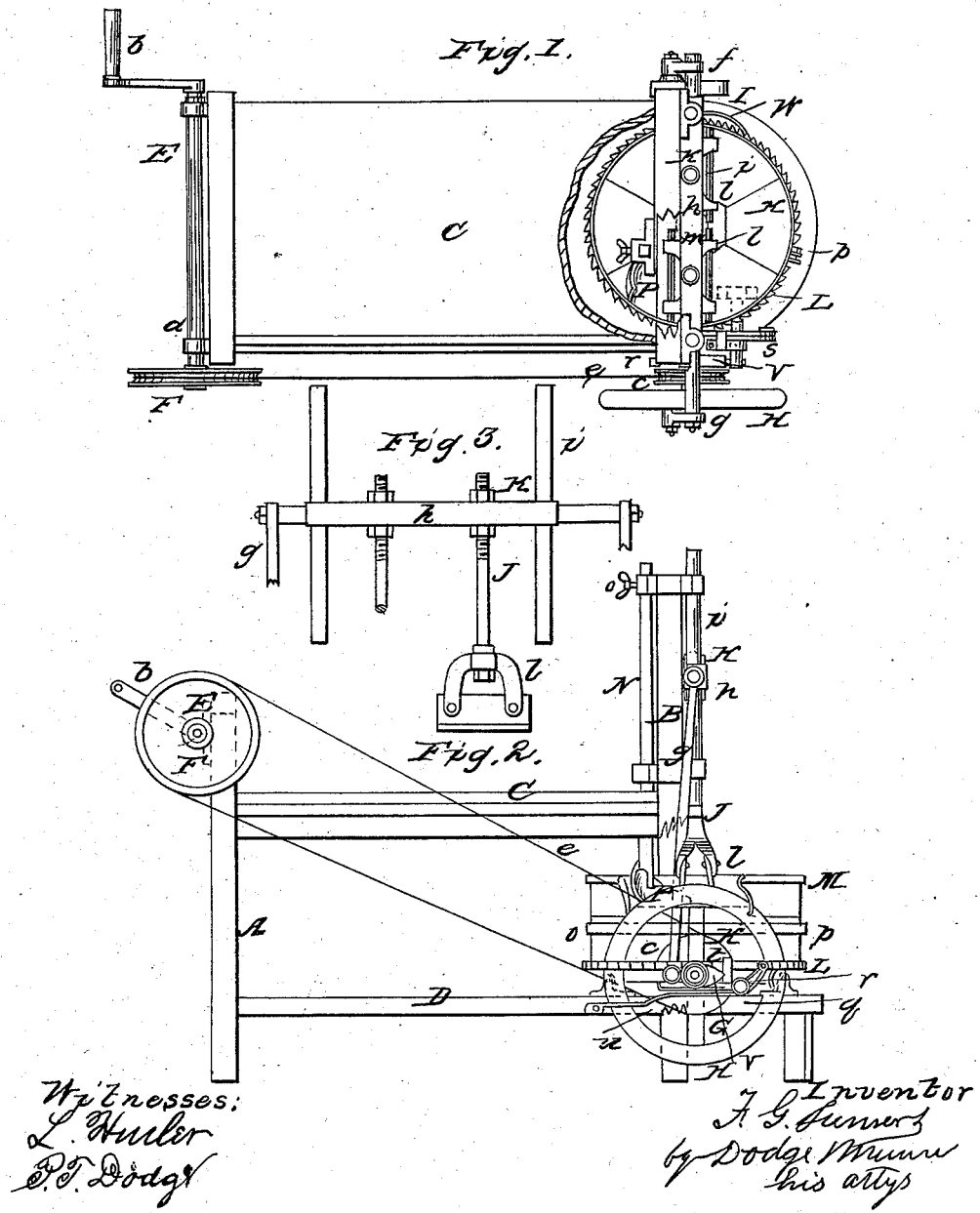

FRANZ G. SIEMERS, OF WINONA, MINNESOTA.

Letters Patent No. 81,421, dated August 25, 1868.

IMPROVED MEAT-CUTTER.

The Schedule referred to in these Letters Patent and making part of the same.

TO ALL WHOM IT MAY CONCERN:

Be it known that I, FRANZ G. SIEMERS, of Winona, in the county of Winona, and State of Minnesota, have invented certain new and useful Improvements in Meat-Choppers; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to meat-choppers, and consists in the construction and arrangement of certain mechanical devices in a novel manner, so as to produce a new and useful machine for expeditiously cutting or chopping up meat.

In the drawings—

Figure 1 is a top plan view, with a portion broken away.

Figure 2 is a side elevation, and

Figure 3 is a front view of the cutting-apparatus detached.

In constructing my machine, I make a suitable frame, consisting principally of the uprights A and B and the tables C and D, as shown in figs. 1 and 2. On the upper rear side of the uprights A, I mount a shaft, E, in bearings $a$, and provide it at one end with a crank, $b$, and at the other with a driving-wheel, F. In front of the uprights B, and near the lower table, D, I mount a shaft, G, in bearings suitable for the purpose, attached to the uprights; and on one end of the shaft G, I attach rigidly a crank-wheel, I, and to the other a pulley-wheel, $c$, and fly-wheel H, the former connecting with the driving-wheel F by the belt or cord $e$, all as clearly shown in fig. 1.

To the fly-wheel H and wheel I, at points equally distant from the centres, and in the same direction from the same, I attach the pitmen $f$ $g$, and connect them to the cross-bar $h$, to which are rigidly connected the vertical bars $i$, which move in guides $j$ attached to the uprights B, as clearly shown in figs. 2 and 3.

The cross-bar $h$, I provide with two or more vertical rods, J, arranged so as to be adjustable vertically by means of the nuts $k$, and having attached to their lower ends two knives, $l$, respectively, shaped and arranged as shown in figs. 2 and 3.

On the lower table, D, and immediately over the shaft G, I mount a circular chopping-block, K, on a central pivot, $m$, shown by the dotted lines in fig. 1, and so as to run on friction-rollers $n$, as shown in fig. 2. This chopping-block K, I construct of several pieces, arranged so as to present their ends to the knives, as shown in fig. 1, uniting and binding them together by bands $o$, provided with set-screws $p$, so as to avoid splitting, and to adjust for shrinking. If the parts composing the block become loosened from any cause, they can readily be tightened by the bands and set-screws.

On the under side of the chopping-block, I fasten a ratchet-circle, L, so as to project beyond the outer edge of the block, as shown in fig. 1; and on the table D, just in front of the shaft G, I mount a short rock-shaft, $q$, provided with two arms, $r$ and $s$, as shown in figs. 1 and 2. To the end of the arm $s$, I hinge a pawl, $t$, which operates against the teeth of the ratchet-circle L, and turns the chopping-block. The arm $r$ passes immediately under the shaft G, and is held up by a spring, $u$, attached to the side of the table D. On the shaft G, I place an eccentric, $v$, which, in revolving with the shaft, presses down the arm $r$, which, in turn, causes the pawl $t$ to turn the chopping-block. Near the other side of the chopping-block, and to the upright, B, I attach a pawl, $w$, for holding the block K in position as it is moved. The upper side of the chopping-block, I provide with a removable curb, M, as shown in fig. 2, within which the meat to be chopped is placed.

To each of the bars J, two knives are generally attached, as shown in fig. 2. When two bars are used, and two knives attached to each, and arranged to work on the chopping-block, as shown, the meat will be cut quicker and finer at the centre of the block than out near its periphery. In order, however, that the meat may be thrown to the centre, so as to be cut evenly, I attach to the rear side of the cross-pieces uniting the uprights B, a bar, N, so as to be adjustable vertically by means of the set-screw O, and having connected to its lower end a scoop or scraper, P, shaped so as to force the meat from the edge of the block to its centre.

In operating my machine, I first prepare the meat on the table C, and then place it on the chopping-block K within the curb M; and then, adjusting the knives $l$ and scraper P as desired, I turn the crank $b$, which revolves the driving-wheel F, and by means of the belt $e$, the wheel $c$ and shaft G. The shaft G revolves the wheels I and H, which, by means of the pitmen $f$ and $g$, give a reciprocating vertical motion to the knives $l$. At the same time, by means of the eccentric, $v$, it operates the rock-shaft $q$ and turns the chopping-block K. These movements are so timed that when the knives descend, the block K is stationary, and as they ascend, it is turned the distance of one tooth of the ratchet-circle; and as the block is stationary when the knives strike it, but little injury is done, either to the knives or the table or block. As the block revolves, the shape of the scraper P will constantly force the meat from the outer edge to the centre, and thus the meat will be cut uniformly.

As a very rapid motion can be given to the knives, it is obvious that the chopping can be done thoroughly and quickly.

When the first lot is chopped, it can be removed and placed upon the lower table, D, and a new lot put on the block, and cut up as before. For convenience in removing the meat from the chopping-block, I make the curb M so that it can be readily slipped on or off the head of the block. Besides, by having it removable, the head of the block can at any time be cleaned or a new piece inserted.

Having thus described my invention, what I claim, is—

1. The meat-cutting machine, consisting of the frame A B, with the tables C D, the reciprocating frame $h$, with the series of knives attached thereto, and the rotating chopping-block K operated by the shaft G, the rock-shaft $q$, and pawls $t$ and $w$, all constructed and arranged to operate substantially as herein described.

2. The chopping-block K, consisting of a series of pieces set endwise and bound together with band $o$ and set-screws $p$, and provided with the removable curb M, constructed and arranged as herein described.

3. The arrangement of the tables C D, in combination with the meat-cutting apparatus, when constructed as herein set forth.

FRANZ G. SIEMERS.

Witnesses:
   THOMAS SIMPSON,
   ABNER LEWIS.